United States Patent
Lin

(10) Patent No.: US 9,886,759 B2
(45) Date of Patent: Feb. 6, 2018

(54) METHOD AND SYSTEM FOR THREE-DIMENSIONAL DATA ACQUISITION

(71) Applicant: National Taiwan University of Science and Technology, Taipei (TW)

(72) Inventor: Tzung-Han Lin, Yunlin County (TW)

(73) Assignee: National Taiwan University of Science and Technology, Taipei (TW)

( * ) Notice: Subject to any disclaimer, the term of this patent is extended or adjusted under 35 U.S.C. 154(b) by 264 days.

(21) Appl. No.: 14/183,539

(22) Filed: Feb. 19, 2014

(65) Prior Publication Data

US 2015/0109418 A1 Apr. 23, 2015

(30) Foreign Application Priority Data

Oct. 21, 2013 (TW) .............................. 102137943 A

(51) Int. Cl.
*G06T 7/00* (2017.01)
*G01B 11/25* (2006.01)
(Continued)

(52) U.S. Cl.
CPC .......... *G06T 7/002* (2013.01); *G01B 11/2522* (2013.01); *G06T 7/593* (2017.01); *G06T 7/85* (2017.01)

(58) Field of Classification Search
CPC ....... G06T 7/0042; G06T 7/002; G06T 17/10; G06T 2215/16; G06T 7/0075;
(Continued)

(56) References Cited

U.S. PATENT DOCUMENTS 5,754,680 A 5/1998 Sato et al.
6,005,669 A 12/1999 Pahk et al.
(Continued)

FOREIGN PATENT DOCUMENTS

CN 1975324 6/2007
CN 100429476 10/2008
(Continued)

OTHER PUBLICATIONS

"A portable stereo vision system for whole body surface imaging", by Wurong Yu et al., Science Direct, 2009 DOI:10.1016/j.imavis.2009.09.015.*
(Continued)

*Primary Examiner* — Dramos I Kalapodas
(74) *Attorney, Agent, or Firm* — JCIPRNET

(57) ABSTRACT

A method for three-dimensional data acquisition, adapted to acquire three-dimensional data of an object, includes the following steps. A laser light is projected onto a plurality of regions on the surface of the object so as to form a plurality of features within each of the regions. For each of the regions, the object and the features are captured from a first direction and a second direction simultaneously so as to generate a first object image corresponding to the first direction and a second object image corresponding to the second direction. For each of the regions, the first object image and the second object image are processed so as to obtain the two-dimensional coordinates of the features therein. The three-dimensional data of the object is obtained according to the two-dimensional data of the features in the first object image and the second object image corresponding to each of the regions.

6 Claims, 5 Drawing Sheets

(51) Int. Cl.
*G06T 7/80* (2017.01)
*G06T 7/593* (2017.01)

(58) Field of Classification Search
CPC . G06T 17/00; G06T 19/20; G06T 2219/2021; G06T 2219/2016; G06T 2210/56; G06T 15/04; G06T 2207/10012; G06T 2207/30196; G06T 7/0057; G06T 17/20; G06T 2200/08; G06T 7/0065; G06T 7/521; H04N 13/0239; H04N 13/0253; H04N 7/18; H04N 13/02; H04N 5/2256; H04N 13/0246; G01B 11/2522; G01B 11/2513; G01B 11/25; G01B 11/002; G01B 11/03; G01B 11/30; G01B 11/2545; G01B 11/2504; G01B 11/2518; G01B 21/042; G01B 2210/52; G01B 11/245; G01B 11/2441; G01B 11/24; A61B 5/0077; G01S 17/89; G01S 17/48; G06K 9/00; G03B 21/00; G03B 35/00; G01C 11/06

See application file for complete search history.

(56) References Cited

U.S. PATENT DOCUMENTS

| | | | | |
|---|---|---|---|---|
| 6,028,672 | A | 2/2000 | Geng | |
| 6,177,998 | B1* | 1/2001 | Svetkoff | G01B 11/026 250/559.23 |
| 6,208,347 | B1* | 3/2001 | Migdal | G06T 17/20 345/419 |
| 6,415,051 | B1 | 7/2002 | Callari et al. | |
| 6,493,095 | B1* | 12/2002 | Song | G01B 11/24 250/237 G |
| 6,556,706 | B1 | 4/2003 | Geng | |
| 6,700,669 | B1 | 3/2004 | Geng | |
| 6,935,748 | B2* | 8/2005 | Kaufman | G03B 35/00 353/28 |
| 7,375,826 | B1* | 5/2008 | Lavelle | G01B 11/2518 356/606 |
| 7,583,275 | B2* | 9/2009 | Neumann | G06T 17/00 345/419 |
| 8,050,491 | B2* | 11/2011 | Vaidyanathan | G06T 17/10 345/419 |
| 8,243,123 | B1* | 8/2012 | Geshwind | H04N 13/0022 348/42 |
| 8,284,240 | B2* | 10/2012 | Saint-Pierre | G01B 11/03 348/42 |
| 8,416,427 | B2 | 4/2013 | Marcil et al. | |
| 8,760,510 | B2* | 6/2014 | Aloe | G06K 9/00214 348/142 |
| 8,823,775 | B2* | 9/2014 | Xu | 348/46 |
| 2005/0068523 | A1* | 3/2005 | Wang | G01B 11/2504 356/243.1 |
| 2005/0274913 | A1 | 12/2005 | Sawada | |
| 2007/0065002 | A1* | 3/2007 | Marzell | G06T 7/0051 382/154 |
| 2008/0201101 | A1* | 8/2008 | Hebert | G01B 11/245 702/152 |
| 2009/0167843 | A1* | 7/2009 | Izzat | G06T 7/593 348/43 |
| 2009/0310828 | A1* | 12/2009 | Kakadiaris | G06K 9/00208 382/118 |
| 2010/0134600 | A1* | 6/2010 | McKeon | G06K 9/00214 348/48 |
| 2010/0277571 | A1* | 11/2010 | Xu | G06T 17/00 348/47 |
| 2011/0134225 | A1* | 6/2011 | Saint-Pierre | G01B 11/03 348/47 |
| 2013/0054187 | A1* | 2/2013 | Pochiraju | G01C 3/08 702/150 |
| 2013/0093852 | A1* | 4/2013 | Ye | A61H 3/061 348/46 |
| 2013/0169759 | A1* | 7/2013 | Godavarty | A61B 5/0073 348/47 |
| 2013/0215132 | A1* | 8/2013 | Fong | G06F 3/011 345/582 |
| 2013/0307848 | A1* | 11/2013 | Tena | G06T 17/20 345/420 |
| 2014/0078519 | A1* | 3/2014 | Steffey | G01S 7/4817 356/625 |
| 2014/0168367 | A1* | 6/2014 | Kang | G06T 7/85 348/46 |
| 2015/0178988 | A1* | 6/2015 | Montserrat Mora | G06T 13/40 345/420 |

FOREIGN PATENT DOCUMENTS

| | | |
|---|---|---|
| CN | 101572787 | 11/2009 |
| TW | 201241547 | 10/2012 |
| TW | 201312080 | 3/2013 |

OTHER PUBLICATIONS

Fausto Bernardini et al., "The 3D Model Acquisition Pipeline"; IBM Rsearch Ctr., Yorktown NY Computer graphics vol. 21 (2002).*

Matthew J. Leotta, et al., "Interactive 3D Scanning Without Tracking," Brazilian Symposium on Computer Graphics and Image Processing (SIBGRAPI), Oct. 2007, pp. 205-212.

"Office Action of Taiwan Counterpart Application", issued on Nov. 20, 2014, p. 1-p. 6.

Tzung-Han Lin, "Resolution adjustable 3D scanner based on using stereo cameras," 2013 Asia-Pacific Signal and Information Processing Association Annual Summit and Conference (APSIPA), Oct. 29, 2013-Nov. 1, 2013, pp. 1-5.

Zhi et al., "A Method on Modeling and Visualization of 3D Object," System, 2003, pp. 1-7.

Levoy et al., "The Digital Michelangelo Project: 3D Scanning of Large Statues," SIGGRAPH '00 Proceedings of the 27th annual conference on Computer graphics and interactive techniques, Jul. 23-28, 2000, pp. 131-144.

Boehler and Marbs, "3D Scanning Instruments," Proc.of the CIPA WG6 Int. Workshop on scanning for cultural heritage recording, 2002, pp. 1-4.

Heike et al., "3D digital stereophotogrammetry: a practical guide to facial image acquisition," Head & Face Medicine, Jul. 28, 2010, pp. 1-18.

Isheil et al., "Systematic error correction of a 3D laser scanning measurement device," Optics and Lasers in Engineering, Jan. 2011, pp. 16-24, vol. 49, No. 1.

Scanworks 3D Laser Scanner, http://www.git.com.tw/3dscan03.htm, Scanworks.

Konica Minolta 3D Laser Scanners VIVID 9i/910, http://www.konicaminoltasupport.com/DiMAGE-Scanner.3088.0.html, Konica Minolta DiMAGE Scan series.

FastSCAN Cobra and Scorpion HLS, http://www.rsi-gmbh.de/en/main/news.php, RSI GmbH.

LT high-resolution 3D Camera-Model 150, http://www.ltech.com.tw, Logistic Technology Corporation.

Matthew J. Leotta, et al., "3D Slit Scanning with Planar Constraints," Computer Graphics forum, vol. 27, No. 8, Dec. 2008, pp. 2060-2080.

"Office Action of China Counterpart Application," issued on Feb. 4, 2017, p. 1-p. 12.

* cited by examiner

METHOD AND SYSTEM FOR THREE-DIMENSIONAL DATA ACQUISITION

CROSS-REFERENCE TO RELATED APPLICATION

This application claims the priority benefit of Taiwan application serial no. 102137943, filed on Oct. 21, 2013. The entirety of the above-mentioned patent application is hereby incorporated by reference herein and made a part of this specification.

BACKGROUND OF THE INVENTION

1. Field of the Invention

The present invention generally relates to a method and a system for data acquisition, in particular, to a method and a system for three-dimensional data acquisition.

2. Description of Related Art

In terms of three-dimensional (3D) surface-geometry measurement in the field of computer graphics, the applications include industrial design, reverse engineering, medical image processing, criminal identification, digital documentation of culture artifacts, archaeological artifacts, which may extensively require 3D imaging and data analysis. Moreover, the manufacturing revolution triggered by 3D scanners and 3D printers in recent years reveal the importance of 3D geometry data acquisition.

Conventional 3D laser scanners mostly include transmission components such as rotating mechanisms or moving mechanisms for carrying an object and are able to acquire 3D data of the object in a wider range by changing measuring positions. Such design may require higher manufacturing costs and additional calibration processes. On the other hand, the measuring approach without the usage of transmission components such as projecting a structured light may only provide a certain resolution, but not 3D data acquisition with a higher resolution for a local or particular region. Hence, to quickly and precisely acquire the 3D data of an object through the use of adjustable resolutions and components with low costs is one of the tasks to be solved.

SUMMARY OF THE INVENTION

Accordingly, the present invention is directed to a method and a system for three-dimensional (3D) data acquisition, which quickly and precisely acquire the 3D data of an object through the use of adjustable resolution.

The present invention is directed to a 3D data acquisition method. The method includes the following steps: projecting a laser light onto a plurality of regions on a surface of the object so as to form a plurality of features within each of the regions; for each of the regions, capturing the object and the features from a first direction and a second direction simultaneously so as to generate a first object image corresponding to the first direction and the second object image corresponding to the second direction; for each of the regions, processing the first object image and the second object image so as to obtain two-dimensional (2D) coordinates of the features in the first object image and the second object image; and obtaining the 3D data of the object according to the 2D data of the features in the first object image and the second object image corresponding to each of the regions.

According to an embodiment of the present invention, for each of the regions, before the step of processing the first object image and the second object image so as to obtain the 2D coordinates of the features in the first object image and the second object image, the method further includes the following steps: capturing a calibration object from the first direction and the second direction so as to generate a first calibration image corresponding to the first direction and a second calibration image corresponding to the second direction; and processing the first calibration image and the second calibration image so as to generate a first intrinsic parameter, a first extrinsic parameter, and a first lens distortion parameter corresponding to the first calibration image as well as a second intrinsic parameter, a second extrinsic parameter, and a second lens distortion parameter corresponding to the second calibration image, wherein the first extrinsic parameter and the second extrinsic parameter correspond to a same coordinate system.

According to an embodiment of the present invention, for each of the regions, the steps of processing the first object image and the second object image so as to obtain the 2D coordinates of the features in the first object image and the second object image includes: performing an undistortion calculation on the first object image and the second object image according to the first lens distortion parameter and the second lens distortion parameter so as to generate a first corrected object image and a second corrected object image; obtaining 2D coordinates of a plurality of first features and a plurality of second features, wherein the first features are the features in the first corrected object image and the second features are the features in the second corrected object image; and obtaining a 2D coordinate of a correspondence of each of the first features from the second corrected object image according to each of the first features and a first epipolar line corresponding to each of the first features as well as obtaining a 2D coordinate of a correspondence of each of the second features from the first corrected object image according to each of the second features and a second epipolar line corresponding to each of the second features.

According to an embodiment of the present invention, the step of obtaining the 3D data of the object according to the features in the first object image and the second object image corresponding to each of the regions includes: obtaining the 3D data of the object according to a first projection matrix, a second projection matrix, the 2D coordinates of the first features corresponding to each of the regions, the 2D coordinates of the correspondences of the first features corresponding to each of the regions, the 2D coordinates of the second features corresponding to each of the regions, and the 2D coordinates of the correspondences of the second features corresponding to each of the regions, wherein the first projection matrix is a matrix formed by the first intrinsic parameter and the first extrinsic parameter, and wherein the second projection matrix is a matrix formed by the second intrinsic parameter and the second extrinsic parameter.

According to an embodiment of the present invention, after the step of obtaining the 3D data of the object according to the features in the first object image and the second object image corresponding to each of the regions, the method further includes the following step: generating a plurality of triangular meshes according to the 3D data of the object and accordingly constructing a 3D model of the object.

The present invention is directed to a 3D data acquisition system including a light projecting device, a first image capturing device, a second image capturing device, and an image processing device. The light projecting device is adapted to project a laser light onto a plurality of regions on a surface of the object so as to form a plurality of features within each of the regions. For each of the regions, the first image capturing device and the second image capturing device are adapted to capture the object and the features from a first direction and a second direction simultaneously so as to generate a first object image corresponding to the first direction and the second object image corresponding to the second direction. For each of the regions, the image processing device is adapted to process the first object image and the second object image so as to obtain 2D coordinates of the features in the first object image and the second object image, and obtaining the 3D data of the object according to the 2D data of the features in the first object image and the second object image corresponding to each of the regions.

According to an embodiment of the present invention, for each of the regions, the first image capturing device and the second image capturing device further capture a calibration object from the first direction and the second direction so as to generate a first calibration image corresponding to the first direction and a second calibration image corresponding to the second direction. For each of the regions, the image processing device processes the first calibration image and the second calibration image so as to generate a first intrinsic parameter, a first extrinsic parameter, and a first lens distortion parameter corresponding to the first calibration image as well as a second intrinsic parameter, a second extrinsic parameter, and a second lens distortion parameter corresponding to the second calibration image, where the first extrinsic parameter and the second extrinsic parameter correspond to a same coordinate system.

According to an embodiment of the present invention, for each of the regions, the image processing device performs an undistortion calculation on the first object image and the second object image so as to generate a first corrected object image and a second corrected object image. For each of the regions, the image processing device obtains 2D coordinates of a plurality of first features and a plurality of second features, wherein the first features are the features in the first corrected object image and the second features are the features in the second corrected object image. For each of the regions, the image processing device obtains a 2D coordinate of a correspondence of each of the first features from the second corrected object image according to each of the first feature and a first epipolar line corresponding to each of the first features as well as a 2D coordinate of a correspondence of each of the second features from the first corrected object image according to each of the second features and a second epipolar line corresponding to each of the second features.

According to an embodiment of the present invention, the image processing device obtains the 3D data of the object according to a first projection matrix, a second projection matrix, the 2D coordinates of the first features corresponding to each of the regions, the 2D coordinates of the correspondences of the first features corresponding to each of the regions, the 2D coordinates of the second features corresponding to each of the regions, and the 2D coordinates of the correspondences of the second features corresponding to each of the regions, wherein the first projection matrix is a matrix formed by the first intrinsic parameter and the first extrinsic parameter, and wherein the second projection matrix is a matrix formed by the second intrinsic parameter and the second extrinsic parameter.

According to an embodiment of the present invention, the image processing device further generates a plurality of triangular meshes according to the 3D data of the object and accordingly constructs a 3D model of the object.

To sum up, the method and the system for 3D data acquisition provided in the present invention may generate a plurality of features on an object through projecting a laser light onto a plurality of regions of the object by the light projecting device. A plurality of image sets of the object and the features may be captured by two image capturing devices from different directions, and the 2D coordinates of the features in the image sets may be calculated by an image processing device so as to obtain the 3D data of the object. Moreover, the moving rates, rotating poses, and the number of repeating scans of the light projecting device may be adjusted according to the contour complexity of the object so as to adjust the scan resolutions in both the horizontal direction and the vertical direction. Such method and system of 3D data acquisition may not only adjust the resolution with low costs, but may also process images in real time so as to provide a higher applicability in practical use.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
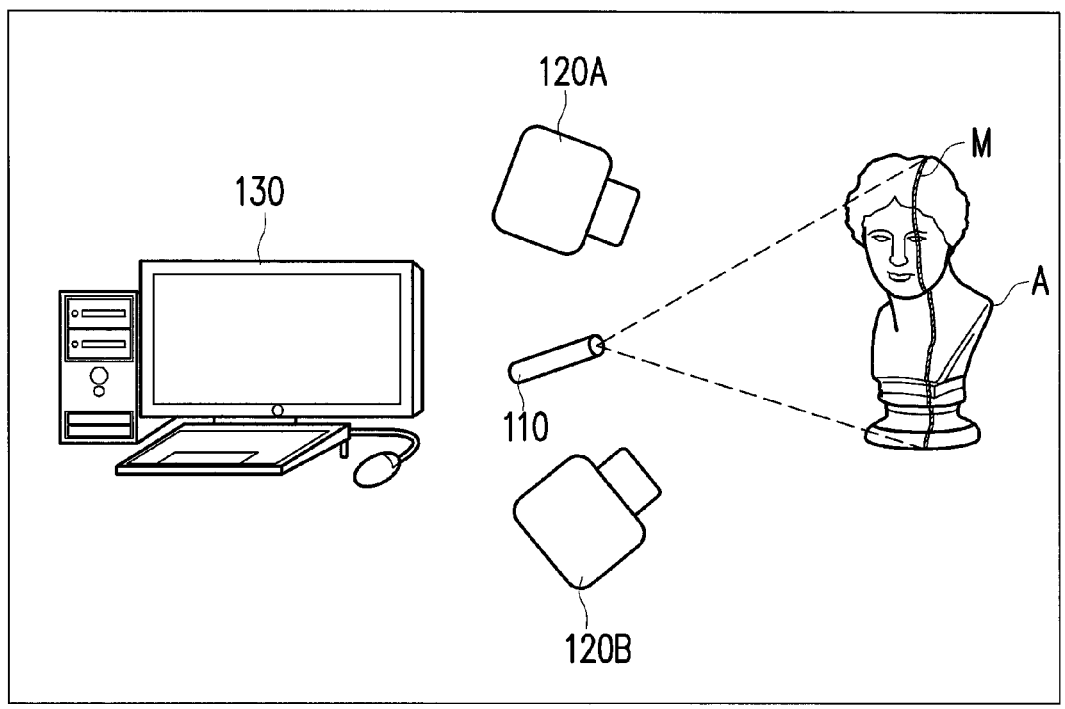
FIG. 1 illustrates a 3D data acquisition system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

FIG. 1 illustrates a three-dimensional (3D) data acquisition system according to an embodiment of the present invention. It should, however, be noted that this is merely an illustrative example and the present invention is not limited in this regard. All components of the 3D data acquisition system and their configurations are first introduced in FIG. 1. The detailed functionalities of the components are disclosed along with FIG. 2.

Referring to FIG. 1, a 3D data acquisition system 100 includes a light projecting device 110, a first image capturing device 120A, a second image capturing device 102B, and an image processing device 130. In the present embodiment, the 3D data acquisition system 100 may perform scanning on an object A so as to acquire the three dimensional data of the object A.

In the present embodiment, the light projecting device 110 is a linear light source and adapted to project a laser light onto the object A. When the light projecting device 110 projects, for example, a red laser light onto the object A, a linear or curved red slit region may be formed on the surface of the object A. Moreover, the light projecting device 110 may be moved arbitrarily by a user or a moving mechanism so that the laser light may be projected onto any spot on the surface of the object A.

In the present embodiment, both the first image capturing device 120A and the second image projecting device 120B may be cameras with charge coupled devices (CCD) and have fixed focal lengths. However, the present invention is not limited herein. In the present embodiment, the first image capturing device 120A and the second image capturing device 120B may be locked on a stand board so that the relative positions between the two devices are fixed. In other words, the angle between the viewing directions of the first image capturing device 120A and the second image capturing device 120B are fixed. The viewing directions of the first image capturing device 120A and the second image capturing device 120B are referred to as "a first direction" and "a second direction" respectively. The first image capturing device 120A and the second image capturing device 120B are configured to continuously and simultaneously capture images of the object A.

In the present embodiment, the image processing device 130 may be a personal computer, a notebook computer, a smart phone, a tabular computer, and yet the present invention is not limited thereto. The image processing device 130 includes a memory and a processor. The memory is adapted to store the images captured by the first image capturing device 120A and the second image capturing device 120B, while the processor is configured to process the images stored in the memory. Furthermore, the image processing device 130 may obtain the images captured by the first image capturing device 120A and the second image capturing device 120B via wired transmission or wireless transmission.

Figure 2:
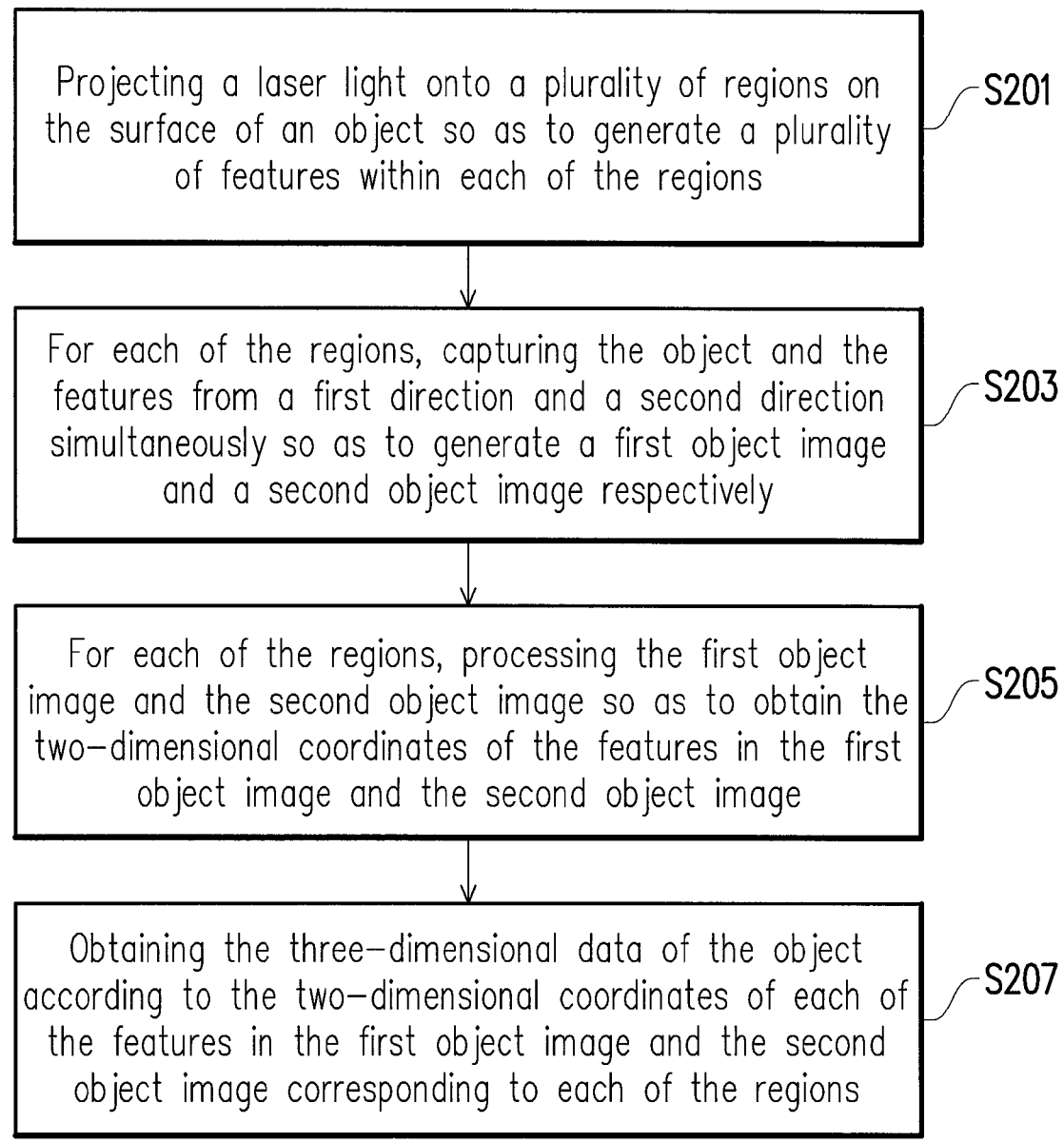
FIG. 2 illustrates a flowchart of a 3D data acquisition method according to an embodiment of the present invention.

FIG. 2 illustrates a flowchart of a 3D data acquisition method according to an embodiment of the present invention. The 3D data acquisition method in FIG. 2 may be implemented by the components of the 3D data acquisition system 100 in FIG. 1.

Referring to both FIG. 1 and FIG. 2, the light projecting device 110 projects a laser light onto a plurality of regions on the surface of the object A so as to generate a plurality of features within each of the regions (Step S201). In the present embodiment, the object A may be a portrait sculpture with an irregular contour on the surface. Such regions are the aforementioned linear or curved slit regions formed on the surface of the object A. As illustrated in FIG. 1, when the light projecting device 110 project a red laser light onto the object A, a red region M may be formed on the surface of the object A. Since the object A has an irregular contours on the surface, a plurality of bright points (not shown) or a plurality of curved bright bands may be formed within the region M. Such bright points or bright bands may be referred to as the aforementioned features. Since the light projecting device 110 may be moved arbitrarily by the user or the moving mechanism, when the light projecting device 110 projects the laser light onto another region on the surface of the object A, a plurality of features may also be formed on the another region. To acquire the complete 3D data of the object A, the light projecting device 110 may project the laser light onto all of the regions on the surface of the object A so as to form a plurality of curves and features. However, only the region M may be illustrated in the present embodiment for simplicity.

Next, for each of the regions, the first image capturing device 120A and the second image capturing device 120B may simultaneously capture the object A and the features from the first direction and the second direction so as to generate a first object image and a second object image respectively (Step S203). For example, when the region M is formed on the surface of the object A, the first image capturing device 120A and the second image capturing device 120B may capture the object A, the region M and the features within the region M simultaneously from the first direction and the second direction. The first image capturing device 120A and the second image capturing device 120B may generate an image set including the first object image and the second object image. When another region is formed on the surface of the object A, the first image capturing device 120A and the second image capturing device 120B may also capture the object A, the another region, and the features on the another region from the first direction and the second direction simultaneously and generate another image set of the first object image and the second object image. Analogously, when the light projecting device 110 projects the laser light onto the other regions on the surface of the object A in Step S201, the first image capturing device 120A and the second image capturing device 120B may generate a plurality image sets of the first object image and the second object image.

Next, for each of the regions, the image processing device 130 may process the first object image and the second object image so as to obtain the two-dimensional (2D) coordinates of the features in the first object image and the second object image (Step S205). That is, after the image processing device 130 obtains the image set of the first object image and the second object image for each of the regions via wired transmission or wireless transmission, it may calibrate the image distortion in the first object image and the second object image of each of the image sets caused by the first image capturing device 120A and the second image capturing device 120B. During the calibration process, the first image capturing device 120A and the second image capturing device 120B may generate a plurality of calibration parameters. Since the features are the bright points formed on the contour surface of the object A, the image processing device 130 may detect the features in the first object image and the second object image of each of the image sets based on, for example, brightness values so as to obtain the 2D coordinates of all the features.

Next, the image processing device 130 may obtain the 3D data of the object A according to the 2D coordinates of each of the features in the first object image and the second object image corresponding to each of the regions (Step S207). In the present embodiment, the image processing device 130 may obtain the 3D data of the object A according to the calibration parameters generated by the first image capturing device 120A and the second image capturing device 120B as well as the 2D coordinates of each of the features in the first object image and the second object image corresponding to each of the regions by singular value decomposition (SVD).

The method for calculating the calibration parameters and the 2D coordinates in Step S205 as well as the method for calculating the 3D data of the object A by using the 2D coordinates of all the features in Step S207 will be discussed in the following descriptions.

Figure 3:
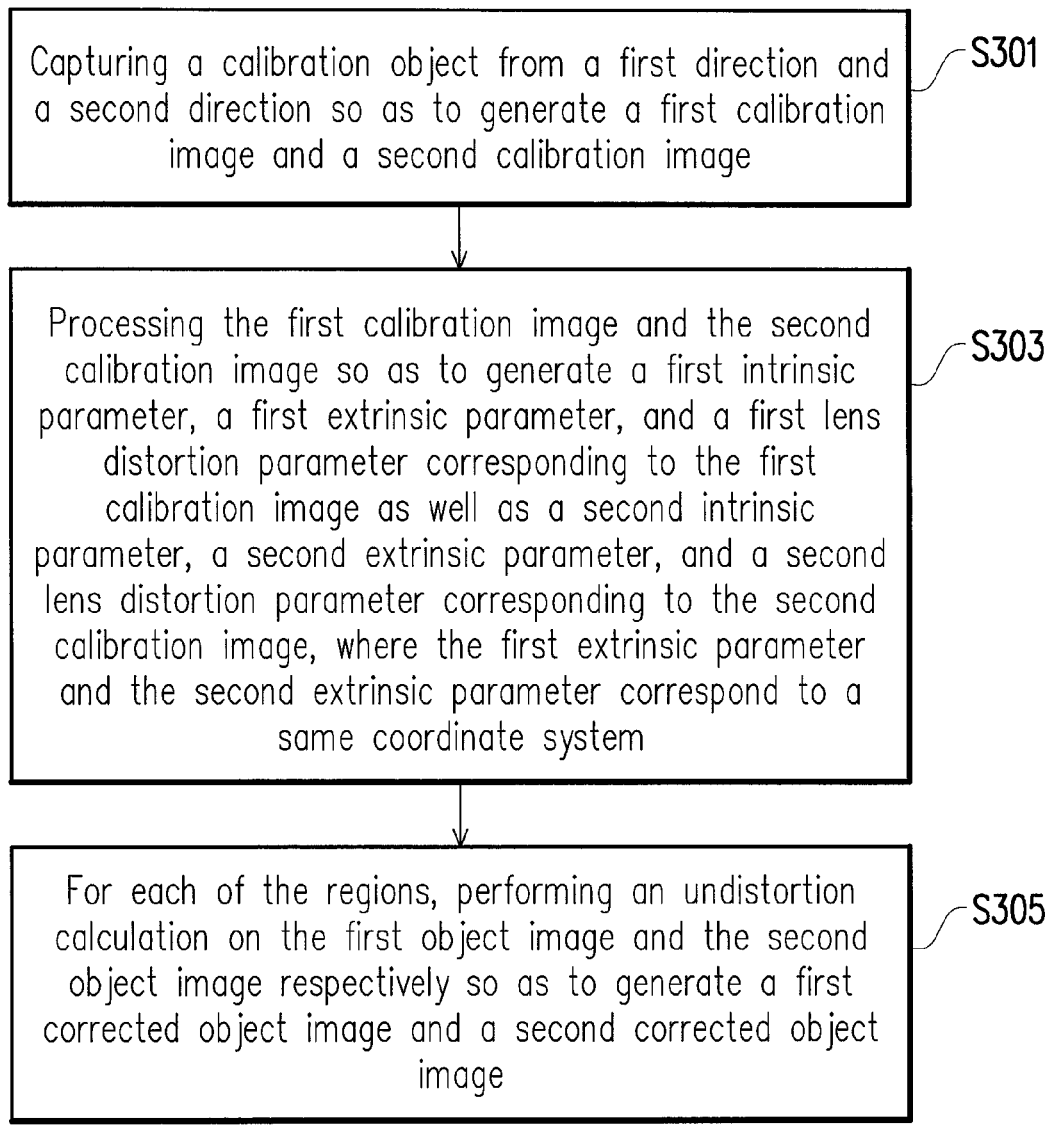
FIG. 3 illustrates a flowchart of an image calibration method according to an embodiment of the present invention.

FIG. 3 illustrates a flowchart of an image calibration method according to an embodiment of the present invention.

Referring to both FIG. 1 and FIG. 3, the first image capturing device 120A and the second capturing device 120B capture a calibration object from the first direction and the second direction so as to generate a first calibration image and a second calibration image (Step S301). To be specific, the 3D data acquisition system 100 may perform a calibration parameter calculating process on the first image capturing device 120A and the second image capturing device 120B by using the calibration object. In the present embodiment, the calibration object may be a board with a reference pattern. Such reference pattern may be a check pattern. After the first image capturing device 120A and the second image capturing device 120B capture the calibration object, they may respectively generate the first calibration image and the second calibration image.

Next, the image processing device 130 may process the first calibration image and the second calibration image so as to generate a first intrinsic parameter, a first extrinsic parameter, and a first lens distortion parameter corresponding to the first calibration image as well as a second intrinsic parameter, a second extrinsic parameter, and a second lens distortion parameter corresponding to the second calibration image, where the first extrinsic parameter and the second extrinsic parameter correspond to a same coordinate system (Step S303). The purpose of performing Step S303 is to obtain the parameters causing the image distortions of the images captured by the first image capturing device 120A and the second image capturing device 120B. Herein, the first projection matrix is formed by the first intrinsic parameter and the first extrinsic parameter, and the second projection matrix is formed by the second intrinsic parameter and the second extrinsic parameter.

To be specific, the first lens distortion parameter and the second lens distortion parameter herein are the lens distortion coefficients of the first image capturing device 120A and the second image capturing device 120B and usually represented by polynomials, which are used to describe barrel distortions or pincushion distortions caused by the lenses. On the other hand, intrinsic parameters may be used to describe the transformation between camera coordinates and image coordinates. That is, the camera coordinates may be projected onto a projective plane according to the pinhole imaging principle, where the projective plane is normally written as a 3×3 matrix. The extrinsic parameters of the first image capturing device 120A and the second image capturing device 120B are used to describe the transformation between the 3D world coordinates and the 3D camera coordinates and may be jointly written as a 3×4 composite matrix of a rotation matrix and a translation matrix. The first projection matrix and the second projection matrix may be represented by Eq. (1.1) and Eq. (1.2) respectively:

$$P=[p_1^T;p_2^T;p_3^T] \quad \text{Eq. (1.1)}$$

$$P=[p'_1{}^T;p'_2{}^T;p'_3{}^T] \quad \text{Eq. (1.2)}$$

Next, for each of the regions, the image processing device 130 may perform an undistortion calculation on the first object image and the second object image respectively so as to generate a first corrected object image and a second corrected object image (Step S305). In other words, after the image processing device 130 performs the undistortion calculation on the first object image and the second object image by using the first lens distortion parameter and the second lens distortion parameter, the first corrected object image and second corrected object image generated thereafter may be the corrected images approximate to pinhole camera models.

Figure 4:
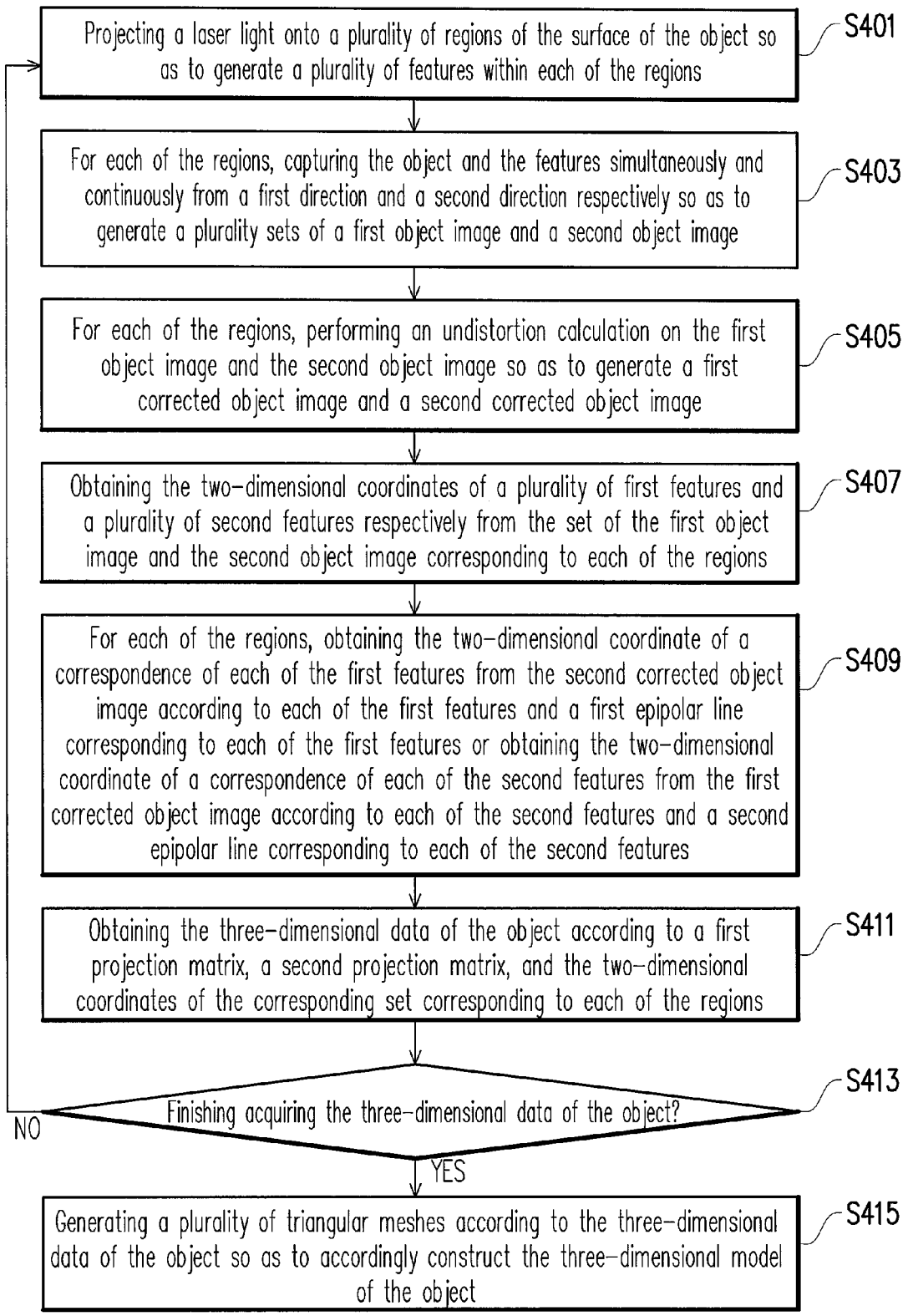
FIG. 4 illustrates a flowchart of a 3D data acquisition method according to an embodiment of the present invention.

FIG. 4 illustrates a flowchart of a 3D data acquisition method according to an embodiment of the present invention.

Referring to both FIG. 1 and FIG. 4, the light projecting device 110 projects a laser light onto a plurality of regions of the surface of the object A so as to generate a plurality of features within each of the regions (Step S401). For each of the regions, the first image capturing device 120A and the second image capturing device 120B capture the object A and the features simultaneously and continuously from a first direction and a second direction respectively so as to generate a plurality sets of a first object image and a second object image (Step S403). That is, while the laser light projected by the light projecting device 110 is being swept through the surface of the object A, the first image capturing device 120A and the second image capturing device 120B simultaneously and continuously capture the object A and the features. The positions of the aforementioned regions may be decided by the user. The moving rate and the rotating pose of the light projecting device 110 may affect the number of the first object images and the second object images. For example, for a fixed image capturing frequency of each of the first image capturing device 120A and the second image capturing device 120B, the faster the light projecting device 110 moves, the fewer the first object images and the second object images are captured in the horizontal direction by the first image capturing device 120A and the second image capturing device 120B; the fewer the rotating poses of the projecting device 110, the fewer the first object images and the second object images are captured in the vertical direction by the first image capturing device 120A and the second image capturing device 120B.

Next, for each of the regions, the image processing device 130 performs an undistortion calculation on the first object image and the second object image so as to generate a first corrected object image and a second corrected object image (Step S405) so that the first object image and the second object image may be corrected to approximate to pinhole camera models. Step S405 may be referred to the related description in FIG. 3 and may not be repeated herein.

Next, the image processing device 130 obtains the 2D coordinates of a plurality of first features and a plurality of second features respectively from the set of the first object image and the second object image corresponding to each of the regions (Step S407), where the first features are the features in the first corrected object images, and the second features are the features in the second corrected object images. The following description will be only focused on a single set of the first corrected object image and the second corrected object image.

Figure 5A:
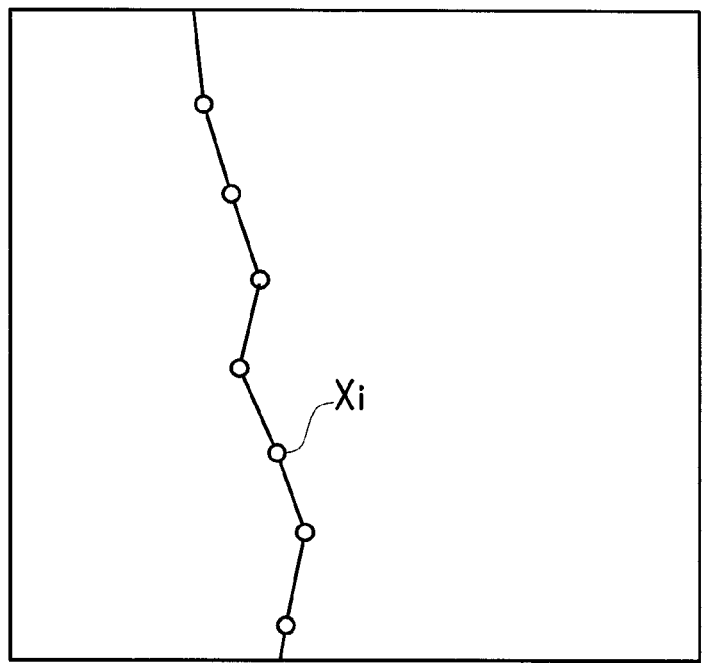
FIG. 5A and FIG. 5B illustrate partially magnified images of a first corrected object image and a second corrected object image captured simultaneously.
Figure 5B:
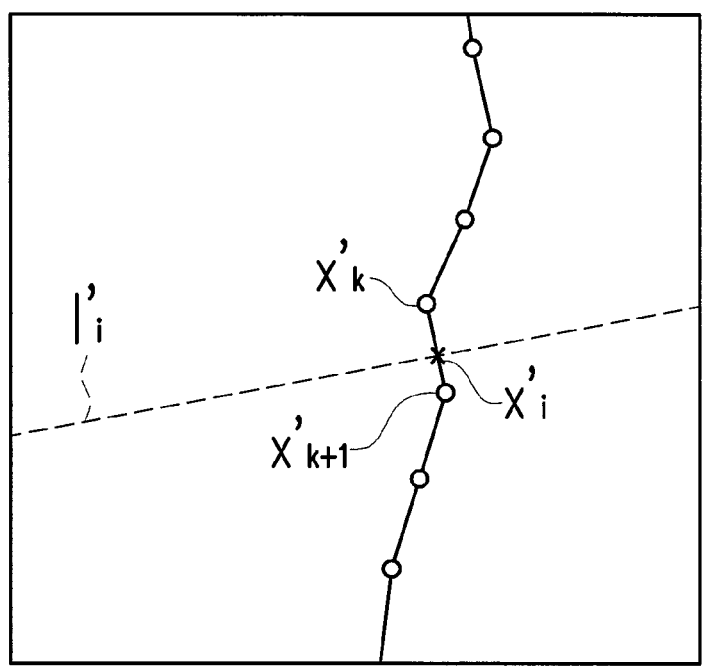

FIG. 5A and FIG. 5B illustrate partially magnified images of the first corrected object image and the second corrected object image captured simultaneously. The image processing device 130 may filter the brightest points on each horizontal line in the first corrected object image and the second corrected object image by setting a threshold. The values of the coordinates of the brightest points are integers in the y-direction (vertical direction) and floating numbers in the x-direction (horizontal direction). The image processing device 130 may determine the coordinates of the sub-pixels of the brightest points in the x-direction with reference to the Gaussian distribution of the brightness values of all the pixels. The hollow dots in FIG. 5A are the bright points filtered from the first corrected object image; that is, the aforementioned first features. The hollow dots in FIG. 5B are the bright points filtered from the second corrected object image; that is, the aforementioned second features.

Revisiting FIG. 4, after Step S407, for each of the regions, the image processing device 130 obtains the 2D coordinate of a correspondence of each of the first features from the second corrected object image according to each of the first features and a first epipolar line corresponding to each of the first features or obtains the 2D coordinate of a correspondence of each of the second features from the first corrected object image according to each of the second features and a second epipolar line corresponding to each of the second features (Step S409). For each of the regions, the first feature point and its correspondence or the second feature point and its correspondence may be referred to as "a corresponding set".

To be specific, according to the computer vision theory, when a spatial point in the 3D space is captured by two cameras at different positions simultaneously, the center of the two cameras, a corresponding set captured by the two cameras, and the aforementioned spatial point may be described by epipolar geometry in the spatial domain. That is, there exists a fundamental matrix representing such transformation. By leveraging such concept, when there exists a feature X on the surface of the object A and when the feature X is captured by the first image capturing device 120A and the second image capturing device 120B simultaneously and calibrated by the image processing device 130, images such as the first corrected object image in FIG. 5A and the second corrected object image in FIG. 5B may be generated. When the feature X is projected onto the first corrected object image and forms a first feature $x_i$, the plane formed by the joint line of the first feature $x_i$ and the center of the first image capturing device 120A along with the center of the first image capturing device 120B may intersect with the second corrected object image.

Suppose that the first feature $x_i$ in FIG. 5A may form an epipolar line $l'_i$ in FIG. 5B through the fundamental matrix, where the epipolar line $l'_i$ is the aforementioned first epipolar line. The epipolar line $l'_i$ and the joint line of a second feature $x'_k$ and another second feature $x'_{k+1}$ may form an intersecting point $x'_i$, where the point $x'_i$ is the correspondence of the first feature $x_i$. In other words, the first feature $x_i$ and the point $x'_i$ are the aforementioned corresponding set. It should be noted that, the distance from either the first feature $x_i$ or the point $x'_i$ to the epipolar line $l'_i$ is less than a specific value such as 1.414 pixels; otherwise, the point $x'_i$ may not be viewed as a valid correspondence. On the other hand, the correspondence of each of the second features in FIG. 5B may also be found in FIG. 5A via a second epipolar line (not shown).

After the image processing device 130 collects the two-coordinates of all of the corresponding sets from the first corrected object image and the second corrected object image of a same set, it may execute the same process on the other sets of the first corrected object image and the second corrected object image. Next, the image processing device 130 obtains the 3D data of the object A according to a first projection matrix, a second projection matrix, and the 2D coordinates of the corresponding set corresponding to each of the regions (Step S411). Take the feature X on the surface of the object A as an example. When the feature X is projected onto the first corrected object image and forms a first feature x, ideally, Eq. (2.1) may be satisfied:

$$x \times [PX] = 0 \qquad \text{Eq. (2.1)}$$

Similarly, in terms of a correspondence x' of the first feature x in the second corrected object image, Eq. (2.2) may be satisfied:

$$x' \times [P'X] = 0 \qquad \text{Eq. (2.2)}$$

where P and P' are the first projection matrix in Eq. (1.1) and the second projection matrix in Eq. (1.2) respectively. Moreover, the first feature x and the correspondence x' of the first feature x may be written as Eq. (3.1) and Eq. (3.2) respectively:

$$x = [x\ y\ 1]^T \qquad \text{Eq. (3.1)}$$

$$x' = [x'\ y'\ 1]^T \qquad \text{Eq. (3.2)}$$

Since the image processing device 130 has already obtained the first projection matrix P, the second projection matrix P', and the corresponding set x and x' in the previous step, Eq. (4) may be further obtained therefrom:

$$\begin{bmatrix} xp_3^T - p_1^T \\ yp_3^T - p_2^T \\ x'p_3'^T - p_1'^T \\ y'p_3'^T - p_1'^T \end{bmatrix} X = \begin{bmatrix} 0 \\ 0 \\ 0 \\ 0 \end{bmatrix} \qquad \text{Eq. (4)}$$

Hence, the image processing device 130 may then obtain the 3D data of the feature X by singular value decomposition (SVD).

It should be noted that, since the laser light may generate a plurality of features on the surface of the object A, and the 3D data of the features may be calculated by the aforementioned algorithm, the user or the moving mechanism may generate more features in the x-direction by repeatedly sweeping the laser light so as to increase the scan resolution in the x-direction or generate more features in the y-direction by slightly tilting the laser light so as to increase the scan resolution in the y-direction. Hence, the user or the moving mechanism may adjust the scan resolution of the light projecting device 110 according to the surface complexity of an object. For example, the object A includes a face region with a complex surface contour and a base region with a simple surface contour. If the light projecting device 110 scans the base region in a higher resolution, excessive features may be generated. If the light projecting device 110 scans the face region in a lower resolution, the surface contour of the face region may not be completely modeled due to lack of samples.

Accordingly, after Step S411, the user or the moving mechanism may determine whether to finish acquiring the 3D data of the object A (Step S413). For example, the user may determine if the acquired 3D data of the object A is sufficient for constructing a 3D model of the object A or not. When the user determines that the acquired 3D data of the object A is insufficient, the 3D data acquisition system 100 may execute Step S401 so as to collect more 3D data of the object A.

When the user determines that the acquired 3D data of the object A is sufficient, the 3D data acquisition system 100 may terminate the 3D data acquisition process on the object A. Meanwhile, the image processing device 130 may generate a plurality of triangular meshes according to the 3D data of the object A so as to accordingly construct the 3D model of the object A (Step S415). Since there already exist a lot of triangulation algorithms in the field of computer graphics, the details thereof may not be described herein.

To sum up, the method and the system for 3D data acquisition provided in the present invention may generate a plurality of features on an object through projecting a laser light onto a plurality of regions of the object by the light projecting device. A plurality of image sets of the object and the features may be captured by two image capturing devices from different directions, and the 2D coordinates of the features in the image sets may be calculated by an image processing device so as to obtain the 3D data of the object. Moreover, the moving rates, rotating poses, and the number of repeating scans of the light projecting device may be adjusted according to the contour complexity of the object so as to adjust the scan resolutions in both the horizontal direction and the vertical direction. Such method and system of 3D data acquisition may not only adjust the resolution with low costs, but may also process images in real time so as to provide a higher applicability in practical use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three-dimensional data acquisition method, adapted to a three-dimensional data acquisition system having a light projecting device, two image capturing devices, and an image processing device for acquiring three-dimensional (3D) data of an object, comprising:

projecting a linear laser light respectively onto a plurality of regions on a surface of the object by the light projecting device so as to form a plurality of features within each of the regions, wherein the regions comprise a first region and a second region with different contour complexities, wherein moving rates, rotating poses with respect to a horizontal direction and a vertical direction, and the numbers of repeating scans that the linear laser light projects onto the first region and the second region are different, and each of the regions is a linear slit region or a curved slit region, and each of the features are bright points;

for each of the regions, capturing the object and the features from a first direction and a second direction simultaneously by the two image capturing devices respectively so as to generate a first object image corresponding to the first direction and the second object image corresponding to the second direction;

for each of the regions, processing the first object image and the second object image by the image processing device so as to obtain two-dimensional (2D) coordinates of the features in the first object image and the second object image comprising:

performing an undistortion calculation on the first object image and the second object image by the image processing device so as to generate a first corrected object image and a second corrected object image wherein for each of the regions, the step of performing the undistortion calculation on the first object image and the second object image by the image processing device so as to generate the first corrected object image and the second corrected object image comprises:

performing the undistortion calculation on the first object image and the second object image by the image processing device according to the first lens distortion parameter and the second lens distortion parameter so as to generate the first corrected object image and the second corrected object image;

obtaining 2D coordinates of a plurality of first features and a plurality of second features by the image processing device, wherein the first features are the features in the first corrected object image and the second features are the features in the second corrected object image, wherein each of the first features and each of the second features are brightest points in each horizontal line, wherein values of the 2D coordinates of the first features and the second features are integers in the vertical direction, and wherein values of the 2D coordinates of the first features and the second features are floating numbers associated with sub-pixels in the horizontal direction with reference to a Gaussian distribution of brightness values of all pixels in the first corrected object image and the second corrected object image; and obtaining a 2D coordinate of a correspondence of each of the first features from the second corrected object image by the image processing device according to each of the first features and a first epipolar line corresponding to each of the first features as well as obtaining a 2D coordinate of a correspondence of each of the second features from the first corrected object image according to each of the second features and a second epipolar line corresponding to each of the second features, wherein the correspondence of each of the first features is an intersecting point between the first epipolar line and a joint line of two of the second features, wherein a distance from each of the first features and a distance from the correspondence of each of the first features are less than a tolerance value; and wherein for each of the regions, before the step of processing the first object image and the second object image by the image processing device so as to obtain the 2D coordinates of the features in the first object image and the second object image, the method further comprises:

capturing a calibration object from the first direction and the second direction respectively by the two image capturing devices so as to generate a first calibration image corresponding to the first direction and a second calibration image corresponding to the second direction;

processing the first calibration image and the second calibration image by the image processing device so as to generate a first intrinsic parameter, a first extrinsic parameter, and a first lens distortion parameter corresponding to the first calibration image as well as a second intrinsic parameter, a second extrinsic parameter, and a second lens distortion parameter corresponding to the second calibration image, wherein the first extrinsic parameter and the second extrinsic parameter correspond to a same coordinate system;

wherein the step of obtaining the 3D data of the object by the image processing device according to the features in the first object image and the second object image corresponding to each of the regions comprises:

obtaining the 3D data of the object by the image processing device according to a first projection matrix, a second projection matrix, the 2D coordinates of the first features corresponding to each of the regions, the 2D coordinates of the correspondences of the first features corresponding to each of the regions, the 2D coordinates of the second features corresponding to each of the regions, and the 2D coordinates of the correspondences of the second features corresponding to each of the regions, wherein the first projection matrix is a matrix formed by the first intrinsic parameter and the first extrinsic parameter, and wherein the second projection matrix is a matrix formed by the second intrinsic parameter and the second extrinsic parameter; and obtaining the 3D data of the object by the image processing device according to the 2D data of the features in the first object image and the second object image corresponding to each of the regions.

2. The 3D data acquisition method according to claim 1, wherein after the step of obtaining the 3D data of the object by the image processing device according to the features in the first object image and the second object image corresponding to each of the regions, the method further comprises:

generating a plurality of triangular meshes by the image processing device according to the 3D data of the object and accordingly constructing a 3D model of the object.

3. A three-dimensional (3D) data acquisition system, adapted to acquire 3D data of an object, comprising:

a light projecting device, projecting a linear laser light respectively onto a plurality of regions on a surface of the object so as to form a plurality of features within each of the regions, wherein the regions comprise a first region and a second region with different contour complexities, and wherein moving rates, rotating poses with respect to a horizontal direction and a vertical direction, and the numbers of repeating scans that the linear laser light projects onto the first region and the second region are different, and each of the regions is a linear slit region or a curved slit region, and each of the features are bright points;

a first image capturing device and a second image capturing device, for each of the regions, capturing the object and the features from a first direction and a second direction simultaneously so as to generate a first object image corresponding to the first direction and the second object image corresponding to the second direction; and an image processing device, for each of the regions, processing the first object image and the second object image so as to obtain two-dimensional (2D) coordinates of the features in the first object image and the second object image, and obtaining the 3D data of the object according to the 2D data of the features in the first object image and the second object image corresponding to each of the regions, wherein the image processing device performs an undistortion calculation on the first object image and the second object image by the image processing device so as to generate a first corrected object image and a second corrected object image, wherein the image processing device obtains 2D coordinates of a plurality of first features and a plurality of second features by the image processing device, wherein the first features are the features in the First corrected object image and the second features are the features in the second corrected object image, wherein each of the first features and each of the second features are brightest points in each horizontal line, wherein values of the 2D coordinates of the first features and the second features are integers in the vertical direction, and wherein values of the 2D coordinates of the first features and the second features are floating numbers associated with sub-pixels in the horizontal direction with reference to a Gaussian distribution of brightness values of all pixels in the first corrected object image and the second corrected object image, and wherein the image processing device obtains a 2D coordinate of a correspondence of each of the first features from the second corrected object image by the image processing device according to each of the first features and a first epipolar line corresponding to each of the first features as well as obtaining a 2D coordinate of a correspondence of each of the second features from the first corrected object image according to each of the second features and a second epipolar line corresponding to each of the second features;

wherein the correspondence of each of the first features is an intersecting point between the first epipolar line and a joint line of two of the second features, wherein a distance from each of the first features and a distance from the correspondence of each of the first features are less than a tolerance value; and the first image capturing device and the second image capturing device further capture a calibration object from the first direction and the second direction so as to generate a first calibration image corresponding to the first direction and a second calibration image corresponding to the second direction, and the image processing device processes the first calibration image and the second calibration image so as to generate a first intrinsic parameter, a first extrinsic parameter, and a first lens distortion parameter corresponding to the first calibration image as well as a second intrinsic parameter, a second extrinsic parameter, and a second lens distortion parameter corresponding to the second calibration image, wherein the first extrinsic parameter and the second extrinsic parameter correspond to a same coordinate system.

4. The 3D data acquisition system according to claim 3, wherein for each of the regions, the image processing device performs the undistortion calculation on the first object image and the second object image according to the first lens distortion parameter and the second lens distortion parameter so as to generate the first corrected object image and the second corrected object image.

5. The 3D data acquisition system according to claim 4, wherein the image processing device obtains the 3D data of the object according to a first projection matrix, a second projection matrix, the 2D coordinates of the first features corresponding to each of the regions, the 2D coordinates of the correspondences of the first features corresponding to each of the regions, the 2D coordinates of the second features corresponding to each of the regions, and the 2D coordinates of the correspondences of the second features corresponding to each of the regions, wherein the first projection matrix is a matrix formed by the first intrinsic parameter and the first extrinsic parameter, and wherein the second projection matrix is a matrix formed by the second intrinsic parameter and the second extrinsic parameter.

6. The 3D data acquisition system according to claim 3, wherein the image processing device further generates a plurality of triangular meshes according to the 3D data of the object and accordingly constructs a 3D model of the object.

* * * * *